(12) United States Patent
Shah

(10) Patent No.: US 7,171,463 B1
(45) Date of Patent: Jan. 30, 2007

(54) SYSTEM AND METHOD FOR DENOTING AND COMMUNICATING WITH COMPUTER NETWORK MOBILE SITES

(75) Inventor: Nitin J. Shah, Scotch Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/082,044

(22) Filed: May 20, 1998

(51) Int. Cl.
*G06F 15/16* (2006.01)
*H04Q 7/20* (2006.01)

(52) U.S. Cl. ............... 709/224; 709/219; 709/227; 370/231; 455/423; 455/450

(58) Field of Classification Search ............... 709/219, 709/223, 224, 225, 221, 227, 228, 232; 455/428, 455/430, 437, 422, 436, 431, 439, 435, 423, 455/450; 370/231, 468
See application file for complete search history.

(56) References Cited

U.S. PATENT DOCUMENTS

| | | | |
|---|---|---|---|
| 5,519,697 A | | 5/1996 | Fujita et al. |
| 5,732,074 A | * | 3/1998 | Spaur ..................... 370/313 |
| 5,757,916 A | * | 5/1998 | MacDoran et al. ......... 380/258 |
| 5,845,079 A | * | 12/1998 | Wada ..................... 709/219 |
| 5,867,785 A | * | 2/1999 | Averbuch et al. ........... 455/436 |
| 5,875,296 A | * | 2/1999 | Shi ........................ 713/202 |
| 5,896,558 A | * | 4/1999 | Wiedeman ................ 455/12.1 |
| 5,924,033 A | * | 7/1999 | Carlsson et al. ........... 455/436 |
| 5,933,832 A | * | 8/1999 | Suzuoka .................. 707/101 |
| 5,935,207 A | * | 8/1999 | Logue .................... 709/219 |
| 5,941,955 A | * | 8/1999 | Wilby et al. .............. 709/242 |
| 5,963,862 A | * | 10/1999 | Adiwoso .................. 455/430 |
| 5,970,408 A | * | 10/1999 | Carlsson et al. ........... 455/439 |
| 5,974,460 A | * | 10/1999 | Maddalozzo, Jr. et al. . 709/224 |
| 6,003,030 A | * | 12/1999 | Kenner et al. ............. 709/203 |
| 6,192,416 B1 | * | 2/2001 | Baxter ..................... 709/248 |
| 6,201,971 B1 | * | 3/2001 | Purnadi et al. ............ 455/450 |
| 6,260,070 B1 | * | 7/2001 | Shah ..................... 709/230 |
| 6,282,281 B1 | * | 8/2001 | Low ...................... 379/230 |

FOREIGN PATENT DOCUMENTS

WO  WO 96/39770  12/1996
WO  WO 97 22211  7/1997

OTHER PUBLICATIONS

Tanenbaum, Computer Networks, Prentice Hall, 432-434 367-370, 1996.*
Perkins et al., DHCP for mobile networking with TCP/IP, Jun. 27, 1995, IEEE Proceedings 1995, pp. 255-261.*
Jue et al., Design and analysis of replicated servers to support IP-Host mobility in Enterprise networks, IEEE 1997, pp. 1256-1260.*

(Continued)

*Primary Examiner*—Khanh Quang Dinh

(57) ABSTRACT

A system for, and method of, denoting and communicating with a computer network site and a computer network incorporating the system or the method. In one embodiment, the system includes: (1) an address parser that makes a determination of whether the site is a mobile site from an address of the site and (2) a communications manager that manages communication with the site based on the determination.

12 Claims, 3 Drawing Sheets

OTHER PUBLICATIONS

David et al., WO 97 22211 A , Jun. 1997, Hewlett Pack, Jun. 19, 1997.*
"Newton's Telecom Dictionary" a Flatiron Publiching, Inc. book; Jul. 1996; pp. 92 & 383.
Perkins, C. E. et al. "DHCP for mobile networking with TCP/IP" Jun. 27, 1995, Proceedings IEEE International Symposium on Computers and Communications, pp. 255-261, XP002132695.
Jue, J. P. et al. "Design and analysis of replicated servers to support IP-host mobility in enterprise networks" 1997, Communications, 1997. ICC '97 Montreal, Towards the Knowledge Millennium. 1997 IEEE International Conference Montreal, Que., Canada Jun. 8-12, 1997, New York, NY, USA, IEEE, US, pp. 1256-1260, XP010226957, ISBN: 0-7803-3925-8.

* cited by examiner

SYSTEM AND METHOD FOR DENOTING AND COMMUNICATING WITH COMPUTER NETWORK MOBILE SITES

TECHNICAL FIELD OF THE INVENTION

The present invention is directed, in general, to computer networks and, more specifically, to a system and method for denoting and communicating with computer network mobile sites and a computer network incorporating the system or the method.

BACKGROUND OF THE INVENTION

The Internet has become the largest and certainly one of the most important computer networks in existence today. An enormous volume of data and information is communicated over the Internet daily, and this volume is growing rapidly. Internet access is accomplished through the use of domain names which uniquely identify a particular location an makes communicating with the site a directly simple task from anywhere in the world. Today, most of these Internet sites are typically available twenty-four hours a day unless there is some sort of technical malfunction associated with either the computer or communications systems that make access to the sites possible.

The domain names which identify sites are generally organized into several groupings designated by a top level domain name. One top level domain name is used to group all of the domain names that are associated with educational institutions. This is accomplished by using a designator of ".edu" at the end of the domain name to indicate that the organization belongs to the class of educational institutions. Other designators are used to indicate government and commercial interests. Also, the domain name itself usually contains information that may be used to delineate the particular name of the entity being represented. If a particular site is not always available for access, that site may have a "mirror" site which is available whenever a request is made. These mirror sites are usually updated on a periodic basis in order to maintain the data and information at as current a level as possible. Sometimes, the requester may not know that the site they are currently contacting is actually a mirror site, and that the data may not be current. This may, of course, cause the requester problems whose severity depends on the mirror site's update frequency, pattern and importance. This problem is amplified if the regular site is a mobile site and not available much of the time. Even worse, if the mobile site has no mirror site and the requester attempts continual contact while the mobile site is not operational, the requestor may draw false conclusions about the site's permanent situation.

Accordingly, what is needed in the art is a way to distinguish mobile sites on a computer network using a communications infrastructure.

SUMMARY OF THE INVENTION

To address the above-discussed deficiencies of the prior art, the present invention provides a system for, and method of, denoting and communicating with a computer network site and a computer network incorporating the system or the method. In one embodiment, the system includes: (1) an address parser (which may take the form of a domain name parser) that makes a determination of whether the site is a mobile site from an address (or domain name) of the site and (2) a communications manager that manages communication with the site based on the determination.

The present invention therefore introduces the broad concept of managing the communications that may occur between a computer network and a mobile site thereof at the network. This can substantially reduce the amount of data the wireless link between the network and the site has to carry. The communications manager preferably only manages communications pertaining to one or more mobile sites. Therefore, in one embodiment of the present invention, the communications manager only acts when the address parser determines, with reference to a site's address (or, more specifically, all or a part of a site's domain name), that a site is a mobile site.

In one embodiment of the present invention, the communications manager redirects the communications to a mirror of the site when the site is a mobile site. The mirror contains a (perhaps time-delayed) copy of the data present at the mobile site. To the extent that the communications can be made to occur with the mirror instead of the site itself, wireless bandwidth is saved.

In a more specific embodiment of the present invention, the communications manager prompts the site to update the mirror. Given the practical difficulties with continuous mirror updating, it is advantageous that the site update the mirror occasionally. In a more specific embodiment of the present invention, the communications manager periodically prompts the site to update the mirror. Of course, the site itself can update the mirror without prompting by the communications manager, perhaps based on time or a revision of data present at the site.

In one embodiment of the present invention, the communications manager buffers the communications to accommodate a lower bandwidth when the site is a mobile site. The communications manager may employ an alternative, relatively low bandwidth protocol to "repackage" the communications for wireless transmittal. In a related embodiment, the communications manager acknowledges the communications to the mobile site. This saves wireless bandwidth by freeing the wireless link of acknowledgment messages.

In an embodiment of the present invention to be illustrated and described, the address parser takes the form of a domain name parser. The domain name parser makes the determination of whether the site is the mobile site from a top level domain name of the site. Current top-level domain names include ".com," ".gov," ".edu" and ".net." In an embodiment of the present invention to be illustrated and described, a top-level domain name of ".mob" is employed to denote mobile sites. Of course, the present invention is not limited to parsing top-level domain names.

In one embodiment of the present invention, the address parser and the communications manager are associated with the Internet. Those skilled in the art will perceive, however, that the principles of the present invention are fully employable with respect to other types of networks, including local area networks (LANs) and wide area networks (WANs).

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
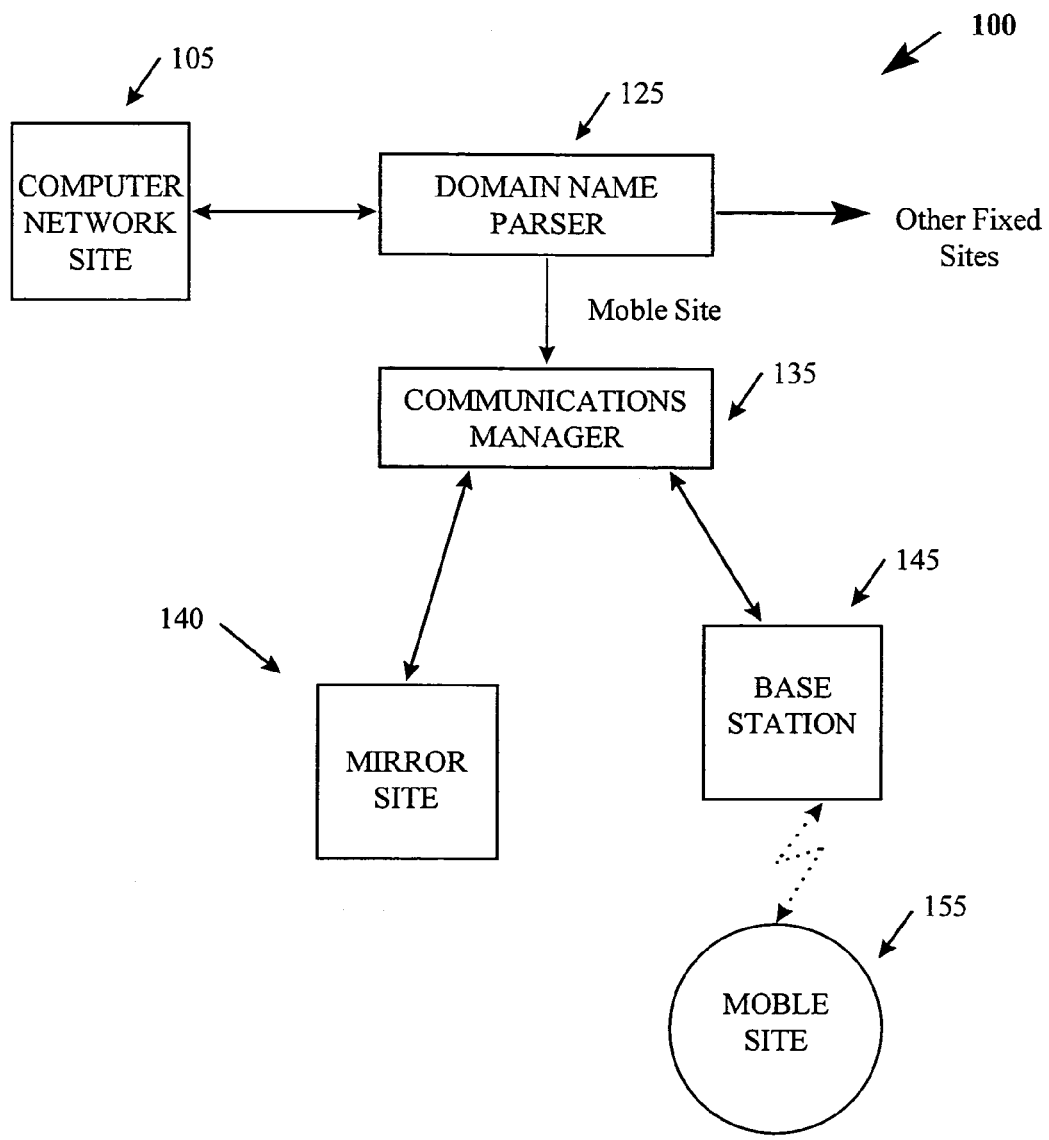
FIG. 1 illustrates a system for denoting and communicating with a computer network site constructed according to the principles of the present invention.

Referring initially to FIG. 1, illustrated is a system 100 for denoting and communicating with a computer network site constructed according to the principles of the present invention. The system 100 includes a computer network site 105, a domain name parser 125 (one type of an address parser), a communications manager 135, a mirror site 140, a base station 145 and a mobile site 155 as part of a computer network. The system 100 provides a system for, and method of, denoting and communicating with the computer network site 105 and the remainder of the computer network.

The domain name parser 125 makes a determination of whether the site is a mobile site from a domain name of the site. The domain name parser 125 may make the determination of whether the site is the mobile site 155 from a top level domain name of the site. Current top-level domain names include ".com," ".gov," ".edu" and ".net" as previously discussed. A top-level domain name of ".mob" may also be employed to denote mobile sites. Of course, the present invention is not so limited. The domain name parser may be an address parser, parsing the address of the site, rather than its corresponding domain name.

The communications manager 135 manages communication with the mobile site 155 based on the determination. The domain name parser 125 and the communications manager 135 may be associated with the Internet. Those skilled in the art will perceive, however, that the principles of the present invention are fully employable with respect to other types of networks, including LANs and WANs.

The base station 145 and the mirror site 140 work in conjunction with the communications manager 135 to appropriately manage the mobile site 155. The base station 145 provides the wireless link to the mobile station 155 and may communicate with a plurality of mobile sites. The mirror site 140 is unique to the mobile site 155 in that it reflects only the data contained in it. However, in other embodiments, the mirror site 140 may combine data from several mobile sites as a situation may warrant.

The present invention therefore introduces the broad concept of managing the communications that may occur between a computer network and the mobile site 155 thereof. This can substantially reduce the amount of data that the wireless link between the network and the site has to carry. In this embodiment of the present invention, the communications manager 135 only acts when the domain name parser 125 determines, with reference to a site's domain name, that a site is a mobile site.

The communications manager 135 may redirect the communications to the mirror site 140 when the site is mobile since the mobile site 155 may not be available. The mirror site 140 is intended to always be available for communication and contains a copy, although perhaps a time-delayed copy, of the data present at the mobile site 155. To the extent that the communications can be made to occur with the mirror instead of the mobile site 155 itself, wireless bandwidth is saved.

The communications manager 135 may prompt the mobile site 155 to update the mirror site 140. Given the practical difficulties with continuous mirror updating, it is advantageous that the mobile site 155 update the mirror site 140 occasionally. Alternately, the communications manager 135 may periodically prompt the mobile site 155 to update the mirror site 140. Of course, the mobile site 155 itself can update the mirror site 140 without prompting by the communications manager 155, perhaps based on time or a revision of data present at the mobile site 155.

Additionally, the communications manager 135 may buffer the communications to accommodate a lower bandwidth with the mobile site 155. The communications manager 135 may employ an alternative, relatively low bandwidth protocol to repackage the communications for wireless transmittal. The communications manager 135 may also acknowledge the communications to the mobile site 155. This saves wireless bandwidth by freeing the wireless link of acknowledgment messages.

Figure 2:
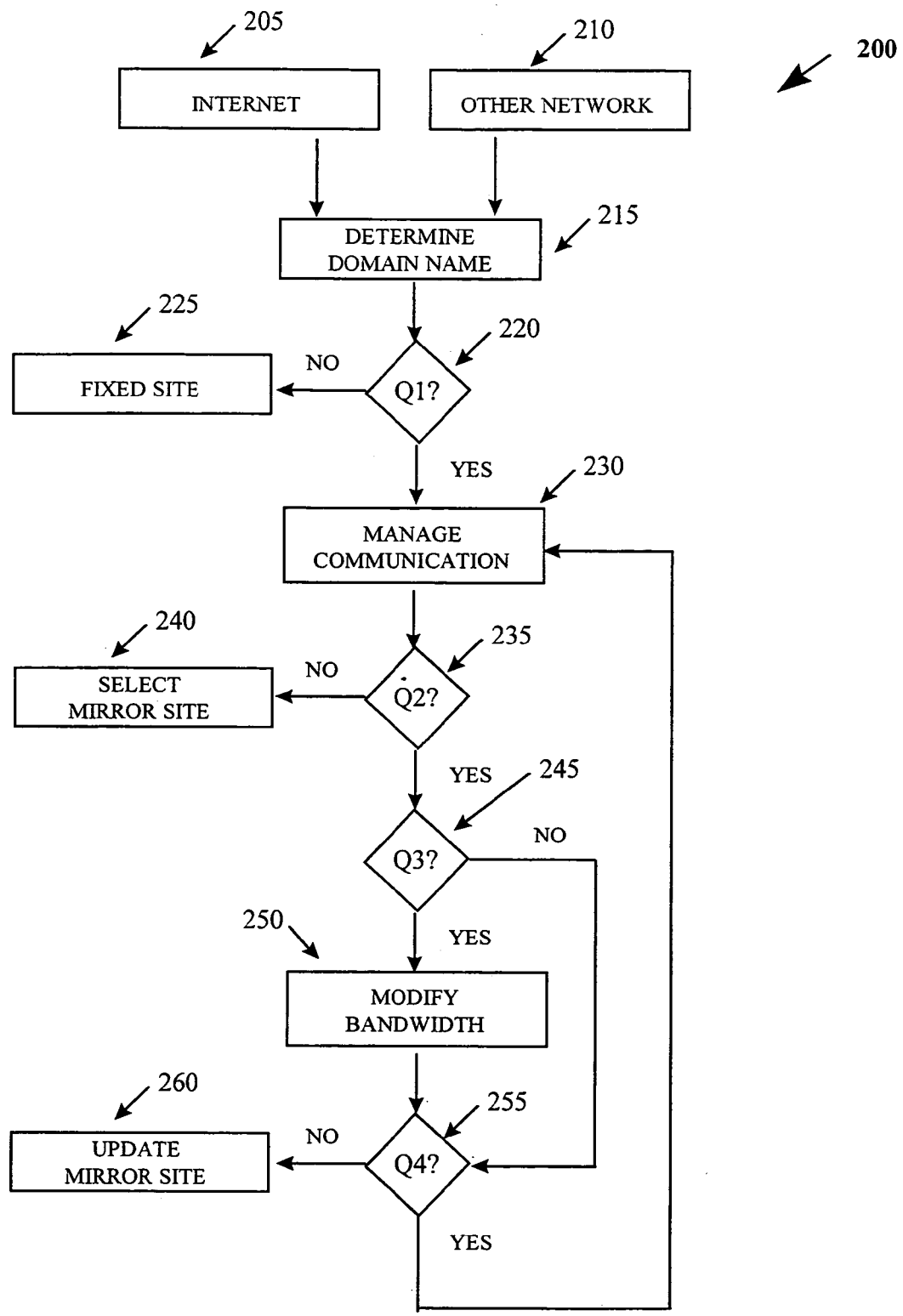
FIG. 2 illustrates a method of denoting and communicating with a computer network site carried out according to the principles of the present invention.

Turning now to FIG. 2, illustrated is a method of denoting and communicating with a computer network site carried out according to the principles of the present invention. A flow diagram 200 comprises making a determination of whether the site is a mobile site from a domain name of the site, and managing communication with the site based on said determination.

The flow diagram 200 shows that the domain names are received by DETERMINE DOMAIN NAME (a block 215) from either INTERNET (a block 205) or from OTHER NETWORK (a block 210). INTERNET (the block 205) represents the domain names that reside on the Internet, and OTHER NETWORKS (the block 210) represents domain names that reside on all other networks, either public or private, to which a user may gain access. DETERMINE DOMAIN NAME (the block 215) would typically reside in the domain name parser 125 of the computer network depicted in the system 100 of FIG. 1.

A first question Q1 (a block 220) asks if the domain name determined in DETERMINE DOMAIN NAME (the block 215) is a mobile site. If the answer is NO, the domain name is directed to FIXED (a block 225) where it is further processed. If the answer to the first question Q1 (the block 220) is YES, it has been selected from a domain name or a top level domain name that indicates it is a mobile site and directs it to MANAGE COMMUNICATION (a block 230) which manages the mobile communication. Managing may comprise acknowledging communications to the mobile site, and by asking a second question Q2 (a block 235).

The second question (the block 235) asks if the mobile site is available. If the answer is NO, the request is redirected to SELECT MIRROR SITE (a block 240) which routes the request to a mirror, that is, coupled to the requested mobile site, for further processing. If the answer to the second question Q2 is YES, the request is directed to a third question Q3 (a block 245). The third question Q3 (the block 245) asks if buffering the communications to accommodate a lower bandwidth is prudent. If the answer is NO, the request is routed to a fourth question Q4 (a block 255). If the answer to the question Q3 (the block 245) is YES, the bandwidth of the wireless signal is modified (normally reduced) in MODIFY BANDWIDTH (a block 250) as appropriate. The fourth question Q4 (the block 255) asks if the mirror has been updated. If the answer is NO, A request is directed to UPDATE MIRROR SITE (a block 260) at which time the mirror is updated. If the answer to the question is YES, then control is returned to MANAGE COMMUNICATION (the block 230) for processing and further processing.

Figure 3:
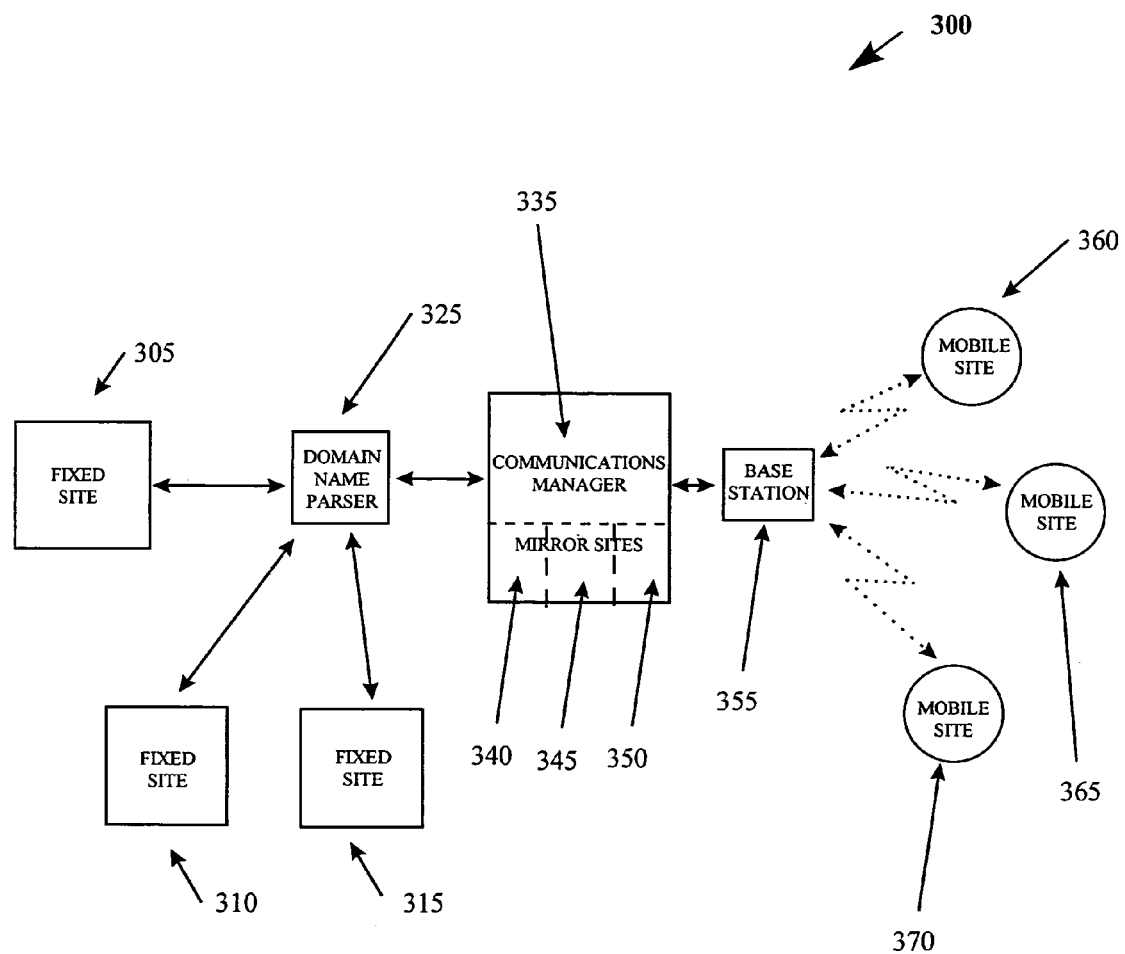
FIG. 3 illustrates a communications infrastructure constructed according to the principles of the present invention and incorporating the system of FIG. 1 or the method of FIG. 2.

Turning now to FIG. 3, illustrated is a communications infrastructure constructed according to the principles of the present invention and incorporating the system of FIG. 1 or the method of FIG. 2. A computer network 300, comprising a plurality of fixed sites 305, 310 and 315, having fixed-site domain names associated therewith and a plurality of mobile sites 360, 365 and 370 having mobile-site domain names associated therewith. Further, the computer network 300 comprises, a communications infrastructure that couples ones of the pluralities of fixed sites 305, 310 and 315 and mobile sites 350, 355 and 360 for communication therebetween having a domain name parser 325 that determines whether a site is a fixed site or a mobile site from a domain name of the site, and a communications manager 335 that manages communication with the site when the site is a mobile site. Still further, the computer network 300 comprises, a plurality of mirror sites 340 345 and 350 respectively which uniquely serve as mirrors for, and a base station 355 providing wireless communication with, the mobile sites 360, 365 and 370. The computer network 300 may employ the Internet as a communications infrastructure. The domain name parser 325 may determine whether the site is a fixed site or a mobile site from a top level domain name of the site.

The communications manager 335 may redirect the communications to a mirror of a requested mobile site when the site is unavailable or when it is appropriate to do so for any other reason. The communications manager 335 may also prompt a mobile site to update its corresponding mirror site by requesting that a mirror of the mobile site be sent to the mirror site. Additionally, the communications manager 335 may buffer the communications to accommodate a lower bandwidth when a site is a mobile site, and it may acknowledge the communications relayed by the communications infrastructure to a mobile site.

From the above, it is apparent that the present invention provides a system for, and method of, denoting and communicating with a computer network site and a computer network incorporating the system or the method. In one embodiment, the system includes: (1) an address parser that makes a determination of whether the site is a mobile site from an address of the site and (2) a communications manager that manages communication with the site based on the determination.

Although the present invention has been described in detail, those skilled in the art should understand that they can make various changes, substitutions and alterations herein without departing from the spirit and scope of the invention in its broadest form.

What is claimed is:

1. A system for denoting and communicating with a mobile site wirelessly couplable to a computer network, comprising:

an address parser that makes a determination of whether a site is said mobile site or a fixed site of said computer network from a top level domain name of said site, if said site is a fixed site, said site is further processed;

a mirror site, couplable to said computer network, that contains a time-delayed copy of data present at said mobile site; and a communications manager that manages communication with said site based on said determination, said communications manager directing said communication, when said site is a mobile site, either to said mobile site when said mobile site is in wireless communication with said computer network or to said mirror site when said mobile site is out of wireless communication with said computer network, wherein said communications manager buffers said communications to accommodate a lower bandwidth when said site is a mobile site.

2. The system as recited in claim 1 wherein said communications manager prompts said site to update said mirror site.

3. The system as recited in claim 1 wherein said communications manager acknowledges said communications to said mobile site.

4. The system as recited in claim 1 wherein said address parser and said communications manager are associated with the Internet.

5. A method of denoting and communicating with a mobile site wirelessly couplable to a computer network, comprising:

making a determination of whether said site is said mobile site or a fixed site of said computer network based on a top level domain name of said site; and managing communication with said site based on said determination, where said communications managing includes further processing said site when said site is a fixed site and directing said communication, when said site is a mobile site, either to said mobile site when said mobile site is in wireless communication with said computer network or to a mirror site of said mobile site when said mobile site is out of wireless communication with said computer network, said mirror site containing a time-delayed copy of data present at said mobile site, and buffering said communications to accommodate a lower bandwidth when said site is a mobile site.

6. The method as recited in claim 5 wherein said managing comprises prompting said site to update said mirror site.

7. The method as recited in claim 5 wherein said managing comprises acknowledging said communications to said mobile site.

8. The method as recited in claim 5 wherein said making and managing are carried out over the Internet.

9. A computer network, comprising:

fixed sites having fixed-site domain names associated therewith;

mobile sites having mobile-site domain names associated therewith;

a communications infrastructure that couples ones of said pluralities of fixed and mobile sites for communication therebetween;

an address parser that makes a determination of whether a site is one of said mobile sites or one of said fixed sites according to a top level domain name of said site, if said site is a fixed site, said site is further processed;

a mirror site, couplable to said computer network, that contains a time-delayed copy of data present at said mobile site; and a communications manager that manages communication with said site based on said determination, said communications manager directing said communication, when said site is a mobile site, either to said mobile site when said mobile site is in wireless communication with said computer network or to said mirror site when said mobile site is out of wireless communication with said computer network, wherein said communications manager buffers said communications to accommodate a lower bandwidth when said site is a mobile site.

10. The computer network as recited in claim 9 wherein said communications manager prompts said site to update said mirror site.

11. The computer network as recited in claim 9 wherein said communications manager acknowledges said communications relayed by said communications infrastructure to said mobile site.

12. The computer network as recited in claim 9 wherein said communications infrastructure is the Internet.

* * * * *